(12) United States Patent
Xu et al.

(10) Patent No.: US 9,873,807 B2
(45) Date of Patent: Jan. 23, 2018

(54) CORE-SHELL POLYMERIC MATERIALS

(71) Applicant: Cabot Corporation, Boston, MA (US)

(72) Inventors: Jinqi Xu, Westford, MA (US); Paul S. Palumbo, West Newton, MA (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 14/201,028

(22) Filed: Mar. 7, 2014

(65) Prior Publication Data

US 2014/0275395 A1 Sep. 18, 2014

Related U.S. Application Data

(60) Provisional application No. 61/782,959, filed on Mar. 14, 2013.

(51) Int. Cl.
| | | |
|---|---|---|
| *C08F 220/10* | (2006.01) | |
| *C08F 290/06* | (2006.01) | |
| *C09D 11/10* | (2014.01) | |
| *C09D 11/30* | (2014.01) | |
| *C09D 11/324* | (2014.01) | |

(52) U.S. Cl.
CPC ............ *C09D 11/30* (2013.01); *C08F 220/10* (2013.01); *C08F 290/067* (2013.01); *C09D 11/10* (2013.01); *C09D 11/324* (2013.01); *C08L 2201/54* (2013.01); *C08L 2207/53* (2013.01)

(58) Field of Classification Search
CPC ....... C09D 11/30; C09D 11/10; C09D 11/324; C08F 290/067; C08F 220/10; C08L 2201/54; C08L 2207/53
See application file for complete search history.

(56) References Cited

U.S. PATENT DOCUMENTS

| | | | |
|---|---|---|---|
| 5,494,980 A * | 2/1996 | Buter ................. | C08F 283/008 523/201 |
| 5,554,739 A | 9/1996 | Belmont | |
| 5,630,868 A | 5/1997 | Belmont et al. | |
| 5,656,089 A * | 8/1997 | Rouvelin ................ | B05B 12/00 118/323 |
| 5,672,198 A | 9/1997 | Belmont | |
| 5,698,016 A | 12/1997 | Adams et al. | |
| 5,707,432 A | 1/1998 | Adams et al. | |
| 5,851,280 A | 12/1998 | Belmont et al. | |
| 5,885,335 A | 3/1999 | Adams et al. | |
| 5,895,522 A | 4/1999 | Belmont et al. | |
| 5,900,029 A | 5/1999 | Belmont et al. | |
| 5,919,294 A | 7/1999 | Hirasa et al. | |
| 5,922,118 A | 7/1999 | Johnson et al. | |
| 5,990,202 A | 11/1999 | Nguyen et al. | |
| 6,042,643 A | 3/2000 | Belmont et al. | |
| 6,057,384 A | 5/2000 | Nguyen et al. | |
| 6,068,688 A | 5/2000 | Whitehouse et al. | |
| 6,103,380 A | 8/2000 | Devonport | |
| 6,337,358 B1 | 1/2002 | Whitehouse et al. | |
| 6,350,519 B1 | 2/2002 | Devonport | |
| 6,368,239 B1 | 4/2002 | Devonport et al. | |
| 6,372,820 B1 | 4/2002 | Devonport | |
| 6,398,858 B1 | 6/2002 | Yu et al. | |
| 6,472,471 B2 | 10/2002 | Cooke et al. | |
| 6,478,863 B2 | 11/2002 | Johnson et al. | |
| 6,494,943 B1 | 12/2002 | Yu et al. | |
| 6,534,569 B2 | 3/2003 | Mahmud et al. | |
| 6,551,393 B2 | 4/2003 | Devonport et al. | |
| 6,852,158 B2 | 2/2005 | Belmont et al. | |
| 6,911,073 B2 | 6/2005 | Adams et al. | |
| 6,929,889 B2 | 8/2005 | Belmont | |
| 6,942,724 B2 | 9/2005 | Yu | |
| 7,056,962 B2 | 6/2006 | Johnson et al. | |
| 7,173,078 B2 | 2/2007 | Lamprey et al. | |
| 7,569,650 B2 | 8/2009 | Ganapathiappan | |
| 2005/0087104 A1 * | 4/2005 | Nguyen ............. | B01F 17/0085 106/401 |
| 2007/0026332 A1 * | 2/2007 | Ferrar .................... | G03G 5/102 430/64 |
| 2007/0100024 A1 | 5/2007 | Gu et al. | |
| 2009/0090795 A1 * | 4/2009 | Ray ........................ | B05B 1/32 239/703 |
| 2011/0001775 A1 | 1/2011 | Nishiwaki et al. | |
| 2011/0274891 A1 * | 11/2011 | De Rossi ................. | B05D 5/06 428/195.1 |
| 2011/0318551 A1 | 12/2011 | Nakagawa | |

FOREIGN PATENT DOCUMENTS

| | | |
|---|---|---|
| EP | 0796901 B1 | 1/2005 |
| JP | H 08-012736 A | 1/1996 |
| JP | 2003-246958 A | 9/2003 |
| WO | WO 99/23174 A1 | 5/1999 |
| WO | WO 2008/141972 A1 | 11/2008 |
| WO | WO 2011/129821 A1 | 10/2011 |
| WO | WO 2011/143533 A2 | 11/2011 |
| WO | WO 2012/054664 A2 | 4/2012 |

OTHER PUBLICATIONS

International Search Report and The Written Opinion of the International Searching Authority, or The Declaration for International Application No. PCT/US2014/021865, dated May 23, 2014.
Tsubokawa, N., Grafting onto Carbon Black: Reaction of Urethane Prepolymer with Carbon Black Surface, J. Polym. Sci. Polym. Chem. Ed. vol. 20, 1982, 1943-1946.

* cited by examiner

*Primary Examiner* — Patrick Niland

(57) ABSTRACT

Disclosed herein are particulate core-shell materials, comprising a core comprising a polyurethane; and a shell comprising a polyacrylate, wherein the shell coats the core. Also disclosed are methods of making particulate core-shell materials, and aqueous dispersions and inkjet ink compositions comprising the same.

22 Claims, No Drawings

CORE-SHELL POLYMERIC MATERIALS

RELATED APPLICATION

This application claims priority under 35 U.S.C. §119(e) to U.S. Prov. App. No. 61/782,959, filed Mar. 14, 2013, the disclosure of which is incorporated herein by reference.

FIELD OF THE INVENTION

Disclosed herein are particulate materials having a core-shell structure. Also disclosed are aqueous dispersions and inkjet ink compositions comprising such materials, and methods for making particulate materials, dispersions, and ink compositions.

BACKGROUND

Ink compositions generally contain water soluble dyes or water-insoluble pigments. Although some dye-based inks are suitable for their intended purposes, dyes have several disadvantages when used in inkjet ink compositions. For example, water-soluble dyes may dissolve and run when exposed to moisture or water. Dye images may further smear or rub off on contact with felt pen markers or upon being rubbed or touched by finger. Dyes may also exhibit poor light stability when exposed to visible light, ultraviolet light, or sunlight.

Pigments can also be used as colorants in ink compositions to overcome some of the disadvantages of the dyes. However, pigments may not sufficiently adhere to substrates and may also suffer from durability, e.g., as indicated by a trail in a highlight smear test. Accordingly, there remains a need to develop ink compositions comprising such colorants.

SUMMARY

One embodiment provides a particulate core-shell material, comprising,
  a core comprising a polyurethane; and
  a shell comprising a polyacrylate,
  wherein the shell coats the core.
Another embodiment provides a method of making a particulate core-shell material, comprising:
  reacting a vinyl-terminated polyurethane with ethylenically unsaturated monomers.
Another embodiment provides a particulate core-shell material having the formula:
  Polymer A-X-Polymer B
wherein Polymer A comprises a polyurethane positioned in the core and Polymer B comprises a polyacrylate positioned in the shell, and
wherein X is selected from urethane, urea, ester, and amide linkages.
Another embodiment provides a composition comprising at least one pigment and the particulate materials disclosed herein.
Another embodiment provides aqueous dispersion comprising at least one pigment and the particulate materials disclosed herein.
Another embodiment provides an inkjet ink composition comprising at least one pigment and the particulate material disclosed herein.

DETAILED DESCRIPTION

Disclosed herein are particulate materials having a core-shell structure. One embodiment, provides a particulate core-shell material comprising:
  a core comprising a polyurethane; and
  a shell comprising a polyacrylate,
  wherein the shell coats the core.

In one embodiment, the particulate materials are provided in aqueous dispersions and inkjet ink compositions. For example, polymeric materials with film-forming capabilities have been added to pigment-containing inkjet ink compositions to impart durability to the printed product as the film helps adhere pigment particles to the substrate. However, the ability to form a film is balanced with jetting reliability, which is achieved by avoiding adhesion between the particles and the print head nozzle. It has been discovered that the claimed core-shell particles can achieve this balance in that the core can function as a film former whereas the polyacrylate shell can impart jettability.

As used herein, the term "polyurethane" refers to a polymer containing organic moieties joined by urethane (e.g., —NH—C(O)—O—) linkages. The urethane linkage typically results from a condensation reaction between polyisocyanates (e.g., diisocyanates) and polyols (e.g., diols and triols). The polyurethane can also include other types of linkages, such as urea linkages (e.g., —NH—C(O)—NH—), in addition to the urethane linkages.

In one embodiment, polyisocyanates comprise two or more isocyanate groups bonded to organic groups, such as organic groups selected from $C_1$-$C_{10}$ alkylenes, $C_3$-$C_{20}$ cycloalkylenes, $C_3$-$C_{20}$ heterocycloalkylenes, arylenes, heteroarylenes, and combination thereof, each of which may be substituted with $C_1$-$C_{10}$ alkyls or aryls. Exemplary diisocyanate monomers include toluene 2,4-diisocyanate (2,4-TDI), toluene 2,6-diisocyanate (2,6-TDI), hexamethylene diisocyanate (HDI), 4,4'-methylene diphenyl diisocyanate (4,4'-MDI), 2,4'-methylene diphenyl diisocyanate (2,4'-MDI), 2,2'-methylene diphenyl diisocyanate (2,2'-MDI), methylene bis(4-cyclohexyl diisocyanate) (HDMI), m-tetramethylxylene diisocyanate (m-TMXDI), and isophorone diisocyanate (IPDI).

In one embodiment, polyols comprise two or more —OH units, e.g., diols and triols, bonded to organic groups, which can be small molecules or polymers such as polyester polyols, polyether polyols, and polycarbonate polyols. Exemplary organic groups include those selected from $C_1$-$C_{10}$ alkylenes, $C_3$-$C_{20}$ cycloalkylenes, $C_3$-$C_{20}$ heterocycloalkylenes, arylenes, heteroarylenes, polyethers (e.g., polypropylene glycols, polytetramethyleneoxides, polycaprolactones), polyesters (e.g., a poly(butylene adipate) and poly(hexamethylene adipate)), polycarbonates (e.g., polycarbonates prepared from 2-butyl-2-ethylpropyl diol, such as that in the OXYMER® series of products available from the Perstorp Group, or polycarbonates prepared from a mixture of 1,5-pentanediol and 1,6-hexanediol, such as those in the DURANOL® series of products available from Asahi Kasei Chemical Corporation), polyacetals, polythioethers, polyester amides, polyacrylates, polyolefins, polyalkylsiloxanes, and mixtures thereof.

Exemplary polyols include polypropylene glycols, polyethylene/polypropylene glycols, polytetramethyleneoxide diols, poly(butylene adipate)glycols, poly(hexamethylene adipate)diol, polycarbonate diols prepared from substituted or unsubstituted $C_1$-$C_{10}$ alkylene diols (e.g., 1,6-hexanediol, 1,5-pentanediol, 2-butyl-2-ethylpropyl diol), polycarbonates containing hydroxyl groups include products obtained from the reaction of diols (such as propanediol, butanediol, hexanediol, diethylene glycol, triethylene glycol, or tetraethylene glycol) with phosgene, diarylcarbonates (such as diphenylcarbonate) or with cyclic carbonates (such as ethylene or propylene carbonate). Polycarbonates can also be obtained from the reaction between a polyester diol and phosgene, diaryl carbonates, or cyclic carbonates.

In one embodiment, the polyol is a polymer polyol having a number-average molecular weight ranging from 200 g/mol to 6,000 g/mol, e.g., from 400 g/mol to 6,000 g/mol, or from 700 g/mol to 2,000 g/mol. Such molecular weights can be determined by an end group analysis.

Polyurethanes can be made by methods known in the art, e.g., polycondensation reactions. The preparation typically involves multi-step synthetic processes. For example, a NCO-terminated prepolymer can be prepared by reacting a polyol (e.g., diol) monomer with a diisocyanate monomer. The reaction can occur in the absence of solvent or in a water-miscible organic solvent (e.g., acetone or N-methylpyrrolidone) that does not react with isocyanate. The reaction can be carried out optionally at an elevated temperature (e.g., at least about 50° C.) and/or in the presence of a catalyst (e.g., dibutyl tin dilaurate). Reaction times can range from a few minutes to a number of hours, and can depend on factors such as reaction temperature, concentrations of the monomers, reactivity of the monomers, and the presence or absence of a catalyst. Molar amounts of the monomers can be based on the ratio A/B, where A is the molar amount of isocyanate groups and B is the molar amount of the hydroxyl groups from all diol monomers (or diamine monomers, if used). The ratio A/B can be at least about 1, e.g., ranging from 1 to 2. Upon reacting the polyol with the polyisocyanate, an NCO-terminated polyurethane prepolymer can be formed. The ratio A/B can be also less than about 1, e.g., ranging from 0.5 to 1. After the reaction, an OH-terminated (or a NH2-terminated if diamine monomers are used) polyurethane prepolymer can be formed.

In one embodiment, vinyl groups can be attached to polyurethane by a subsequent reaction of the polyurethane prepolymer by using methods known in the art. Such vinyl groups can be originated from monomers containing organic groups, including —COOH, —OH and —NH$_2$, which can react with isocyanate, hydroxyl, or amino groups. Exemplary monomers include acrylic acid, methacrylic acid, itaconic acid, fumaric acid, maleic acid, hydroxyethyl acrylate, and hydroxyethyl methacrylate. For example, hydroxyethyl methacrylate can be reacted with NCO-terminated polyurethane prepolymers to form vinyl-terminated polyurethane under conditions similar to the preparation of polyurethane. In one embodiment, vinyl groups can be attached to polyurethane via a linkage selected from urethane, urea, ester, and amide linkages. In another embodiment, vinyl groups can be attached to either end of a polyurethane chain and/or both ends of a polyurethane chain.

In one embodiment, the polyacrylate shell results from the polymerization of monomers selected from acrylic acids and acrylates. Exemplary monomers for the preparation of polyacrylates include acrylic acid, methacrylic acid, itaconic acid, fumaric acid, maleic acid; sulfonic-acid-containing polymerizable monomers such as 3-sulfopropyl acrylate; amino-containing polymerizable monomers such as N,N-dimethylaminoethyl methacrylate, N,N-diethylaminoethyl methacrylate; alkyl acrylates such as methyl acrylate, ethyl acrylate, isopropyl acrylate, butyl acrylate, 2-ethylhexyl acrylate, lauryl acrylate, stearyl acrylate; alkyl methacrylates such as methyl methacrylate, ethyl methacrylate, isopropyl methacrylate, butyl methacrylate, 2-ethylhexyl methacrylate, lauryl methacrylate, and stearyl methacrylate; reactive polymerizable monomers such as glycidyl acrylate, glycidyl methacrylate, and acrolein; hydroxyl-containing polymerizable monomers such as hydroxyethyl acrylate, hydroxyethyl methacrylate, hydroxypropyl acrylate and hydroxypropyl methacrylate; polyfunctional polymerizable monomers such as ethylene glycol diacrylate, ethylene glycol dimethacrylate, butanediol diacrylate, butanediol dimethacrylate, 1,6-hexanediol diacrylate, 1,6-hexanediol dimethacrylate, polyethylene glycol diacrylate, polyethylene glycol dimethacrylate, trimethylol propane triacrylate, trimethylol propane trimethacrylate, pentaerythritol triacrylate and pentaerythritol trimethacrylate; cationic-group-containing polymerizable monomers such as N,N-dimethylaminoethyl acrylate, N,N-dimethylaminoethyl methacrylate, N,N-diethylaminoethyl acrylate, and N,N-diethylaminoethyl methacrylate.

Other monomers can be copolymerize with the acrylic acid and/or acrylate monomers, including amide group polymerizable monomers such as acrylamide, methacrylamide, N-methylol acrylamide, N-methylol methacrylamide, di-N-methylol acrylamide, di-N-methylol methacrylamide, vinyl acetamide; vinyl-containing monomers such as vinylpyrrolidone, vinyl pyridine, vinyltoluene, and vinyl acetate; styrenes such as styrene and methylstyrene; acrylonitrile; and butadiene.

The polyurethanes forming the core and/or the polyacrylates forming the shell can be linear, branched, crosslinked (bonding between polymers), or grafted (bonding to macromolecules or substrates), by using methods known in the art.

In one embodiment, the polyurethane is crosslinked. Exemplary crosslinking agents include polyamines, polyols, and polyisocyanates having three or more functional groups capable of crosslinking reactions, e.g., from 3-5 functional groups.

In one embodiment, the shell coats or otherwise covers or encapsulates the core, e.g., the entirety of the core. The shell coating, covering, or encapsulation may or may not directly contact the core. In one embodiment, an intermediary layer may be positioned between the shell and the core, e.g., to aid adhesion or aid in providing a desired particle size. In another embodiment, the core is covalently bonded to the shell.

In one embodiment, the particulate core-shell material is the reaction product of a vinyl terminated polyurethane with monomers selected from acrylics and acrylates. The vinyl can terminate the polyurethane via a linkage selected from urethane, urea, ester, amide, and —C—N— linkages. In one embodiment, the vinyl-terminated polyurethane is the reaction product of an NCO-terminated polyurethane prepolymer and hydroxyl-containing ethylenically unsaturated monomers, and the vinyl terminates the polyurethane via a urethane linkage. In another embodiment, the vinyl-terminated polyurethane is the reaction product of an NCO-terminated polyurethane prepolymer and amino-containing ethylenically unsaturated monomers, and the vinyl terminates the polyurethane via a urea linkage. In another embodiment, the vinyl-terminated polyurethane is the reaction product of a hydroxyl-terminated polyurethane prepolymer and acid-containing ethylenically unsaturated monomers, and the vinyl terminates the polyurethane via an ester linkage. In another embodiment, the vinyl-terminated polyurethane is the reaction product of an amino-terminated polyurethane prepolymer and acid-containing ethylenically unsaturated monomers, and the vinyl terminates the polyurethane via an amide linkage. In yet another embodiment, the vinyl-terminated polyurethane is the reaction product of an amino-terminated polyurethane prepolymer and epoxy-containing ethylenically unsaturated monomers, and the vinyl terminates the polyurethane via a —C—N— the linkage.

In one embodiment, the reaction between the polyurethane and the ethylenically unsaturated monomers involves a hydrophobic polyurethane and a hydrophilic ethylenically unsaturated monomer in an organic solvent to generate a soluble polymer. Exemplary organic solvents include alcohols. In one embodiment, the reaction product is capable of self-assembly in aqueous solution to form the particulate core-shell material. For example, upon addition of water, the polymer self-assembles to form the hydrophilic portion as a shell and the hydrophobic portion as the core.

In one embodiment, the vinyl-terminated polyurethane has the formula:

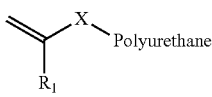

wherein $R_1$ is selected from hydrogen, alkyls and aryls, and X comprises a linkage selected from urethane, urea, ester and amide linkages. Alkyls are saturated linear or branched chain groups of 1-20 carbon atoms, e.g., $C_1$-$C_{12}$, $C_1$-$C_{10}$, or $C_1$-$C_6$ alkyls. Aryls are mono, bi, or other carbocyclic aromatic ring systems, e.g., $C_1$-$C_{20}$ aryls, or $C_1$-$C_{12}$ aryls. Alkyls and aryls can be unsubstituted or substituted, e.g., with alkyls, aryls, hydroxy, halide, alkoxy, amino, amido, carboxy, cyano, ester, ether, halogen, nitro, sulfate, sulfonate, sulfonyl, phosphate, phosphonate, and thio. In one embodiment, R1 is selected from hydrogen and $C_1$-$C_6$ alkyls.

In one embodiment, the vinyl-terminated polyurethane is the reaction product of an NCO-terminated polyurethane prepolymer and hydroxyl-containing ethylenically unsaturated monomers, and X comprises a urethane linkage. In another embodiment, the vinyl-terminated polyurethane is the reaction product of an NCO-terminated polyurethane prepolymer and amino-containing ethylenically unsaturated monomers, and X comprises a urea linkage. In another embodiment, the vinyl-terminated polyurethane is the reaction product of a hydroxyl-terminated polyurethane prepolymer and acid-containing ethylenically unsaturated monomers, and X comprises an ester linkage. In another embodiment, the vinyl-terminated polyurethane is the reaction product of an amino-terminated polyurethane prepolymer and acid-containing ethylenically unsaturated monomers, and X comprises an amide linkage. In yet another embodiment, the vinyl-terminated polyurethane is the reaction product of an amino-terminated polyurethane prepolymer and epoxy-containing ethylenically unsaturated monomers, and X comprises a —C—N— the linkage.

In one embodiment, X has the formula:

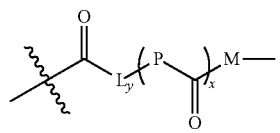

wherein M is bonded to the polyurethane;
wherein M and P are independently selected from NH, O, and $CH_2$; x and y are independently selected from 0 or 1; and L has the formula:

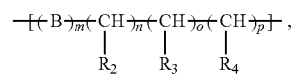

and
wherein $R_2$, $R_3$, and $R_4$ are independently selected from hydrogen, alkyls, aryls, and hydroxyl; B is selected from NH and O; and m, n, o, p, y are independently selected from 0-10.

One embodiment provides a method of making a particulate core-shell material, comprising:
reacting a vinyl-terminated polyurethane with ethylenically unsaturated monomers.

The vinyl-terminated polyurethane can have the structure

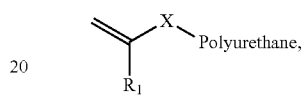

where $R_1$ and X are as defined above.

In one embodiment, the reacting involves a polymerization reaction of the ethylenically unsaturated monomers in the presence of the vinyl-terminated polyurethane. The reacting can be performed via solution polymerization or emulsion polymerization. These polymerization methods are well documented in the literature and well known to those skilled in the art. In one embodiment, the reacting is performed in the presence of a radical initiator.

In one embodiment, the reacting results in a polyurethane-polyacrylate polymer. This polymer can be further combined with a base in aqueous solution to produce the core-shell particulate material via self-assembly of polyurethane-polyacrylate polymers.

In one embodiment, the reacting is performed in an organic solvent to form a solution containing the reaction product, and the method further comprises subjecting the reaction product to an aqueous solution to cause self-assembly of the core-shell material. In one embodiment, the aqueous solution comprises water, e.g., 100% water or a mixture of water and a miscible solvent (e.g., at least 50% water). In one embodiment, the amount of aqueous solution added is sufficient to cause precipitation of the self-assembled core-shell material from solution. The core-shell material can be purified and isolated by methods known in the art.

In one embodiment, the particulate material has the formula:

Polymer A-X-Polymer B wherein Polymer A comprises a polyurethane positioned in the core and Polymer B comprises a polyacrylate positioned in the shell. In one embodiment, X is selected from urethane, urea, ester, and amide linkages.

In one embodiment, the polyurethane core has a weight average molecular weight of at least about 2,000 g/mol (e.g., at least about 5,000 g/mol, at least about 10,000 g/mol). In another embodiment, the polyurethane core has a weight average molecular weight ranging from 2,000 g/mol to 150,000 g/mol, e.g., from 2,000 g/mol to 100,000 g/mol, or from 2,000 g/mol to 50,000 g/mol). In another embodiment, the polyurethane core has a weight average molecular weight ranging from about 10,000 g/mol to about 50,000 g/mol.

Without wishing to be bound by theory, it is believed that an ink composition having the claimed molecular weight provides a balance of properties suitable for increased durability (e.g., as indicated by little or no trail in a highlight smear test) versus jetting capability.

$T_g$ (i.e., the glass transition temperature) can be determined with methods known in the art, such as viscoelasticity measurement or thermal analysis. Alternatively, a theoretical value of $T_g$ for the polymeric material can be calculated based on the $T_g$ of the homopolymers of the polymerizable monomer. For example, $T_g$ of a copolymer acquired from the copolymerization of three monomers, monomer I, monomer II, and monomer III, can be calculated based on in the equation (1) below:

$$100/(T_g \text{ of copolymer}) = (\text{wt \% monomer } I/T_g \text{ homopolymer } I) + (\text{wt \% monomer } II/T_g \text{ homopolymer } II) + (\text{wt \% monomer } III/T_g \text{ homopolymers } III) \quad (1)$$

In one embodiment, the core has a $T_g$ less than or equal to 50° C., e.g., $T_g$ less than or equal to 40° C., less than or equal to 30° C., a $T_g$ less than or equal to 25° C., or a $T_g$ less than or equal to 20° C. In one embodiment, the shell has a $T_g$ of at least 20° C., e.g., a $T_g$ of at least 25° C., or a $T_g$ of at least 30° C. In one embodiment, a $T_g$ of the shell is greater than a $T_g$ of the core.

In one embodiment, the shell is "hard" relative to the "soft" core. Without wishing to be bound by any theory, it is believed that an ink formulation comprising a hard shell/soft core structure provides both the durability and jetting ability. A hard shell affords suitable jetting properties, whereas the soft core allows film formation and provides durability to the resulting printed image. In one embodiment, a $T_g$ of the shell is at least 30° C. and a $T_g$ of the core is less than 30° C. In yet another embodiment, a $T_g$ of the shell is at least 25° C. and a $T_g$ of the core is less than 25° C. In one embodiment, a $T_g$ of the shell is at least 10° C. greater than a $T_g$ of the core.

In one embodiment, the particulate core-shell material has a minimum film formation temperature (i.e., MFFT) of 25° C. or less. (Generally, if the minimum film formation temperature exceeds 25° C., a film cannot be formed under ambient conditions (e.g., room temperature) when an ink containing such particulate material is applied to a recording medium. One or more of gloss brightness, gloss clarity and uniformity of gloss brightness may not be sufficiently achieved in some cases.) The resulting film serves to fix the colorant components in the ink composition onto the surface of a recording medium. Accordingly, the disclosed particulate materials can achieve an image having good smear resistance. The minimum film formation temperature of the polymer particles can be controlled by changing the kinds and compositional ratio of monomers used in the core and shell regions and the weight average molecular weight of the polymer particles. The minimum film formation temperature of the polymer particles can be measured according to the testing method of ISO 2115.

In one embodiment, the particulate materials have a volume-average particle size ranging from 30 nm to 500 nm, e.g., from 50 nm to 400 nm, or from 100 nm to 400 nm. Without wishing to be bound by any theory, it is believed that this size range balances the need for optimum jetting (maximum size of 400 or 500 nm) versus optical density (minimum size of 30, 50, or 100 nm). Upon printing, larger core-shell particles can keep the pigment from absorbing into the paper substrate, thereby enhancing O.D. and/or durability.

In one embodiment, a weight ratio of the core:shell ranges from 10:1 to 1:10, e.g., from 5:1 to 1:5, or from 4:1 to 1:1. Without wishing to be bound by any theory, it is believed that an ink composition having polymer particles with the claimed core:shell weight ratio balance the properties suitable for increased durability (e.g., as indicated by little or no trail in a highlight smear test) versus jetting capability.

Compositions, Dispersions, and Inkjet Ink Compositions

Another embodiment provides compositions comprising a colorant (e.g., at least one pigment) and the particulate materials disclosed herein.

The colorant can be selected from dyes and pigments. In one embodiment, the colorant is a dye, such as conventional dyes including food dyes, FD&C dyes, acid dyes, direct dyes, reactive dyes, derivatives of phthalocyanine sulfonic acids, including copper phthalocyanine derivatives, sodium salts, ammonium salts, potassium salts, lithium salts, and the like. Combinations of dyes may also be used in order to form different shades. Examples of acid dyes include, but are not limited to, Acid Red 18, Acid Red 27, Acid Red 52, Acid Red 249, Acid Red 289, Acid Blue 9, Acid Yellow 23, Acid Yellow 17, Acid Yellow 23, and Acid Black 52. Examples of basic dyes include, but are not limited to, Basic Red 1, Basic Blue 3, and Basic Yellow 13. Examples of direct dyes include, but are not limited to, Direct Red 227, Direct Blue 86, Direct Blue 199, Direct Yellow 86, Direct Yellow 132, Direct Yellow 4, Direct Yellow 50, Direct Yellow 132, Direct Yellow 104, Direct Black 170, Direct Black 22, Direct Blue 199, Direct Black 19, and Direct Black 168. Examples of reactive dyes include, but are not limited to, Reactive Red 180, Reactive Red 31, Reactive Red 29, Reactive Red 23, Reactive Red 120, Reactive Blue 49, Reactive Blue 25, Reactive Yellow 37, Reactive Black 31, Reactive Black 8, Reactive Green 19, and Reactive Orange 84. Other types of dyes can also be used, including, for example, Yellow 104 and Magenta 377.

In addition to the colorant (dyes or pigments), the inkjet ink compositions of the present invention may further incorporate additional dyes to modify color balance and adjust optical density. Such dyes include food dyes, FD&C dyes, acid dyes, direct dyes, reactive dyes, derivatives of phthalocyanine sulfonic acids, including copper phthalocyanine derivatives, sodium salts, ammonium salts, potassium salts, and lithium salts.

In one embodiment, the colorant is selected from pigments, which is a solid material, generally in the form of a particulate or in a form readily formed into a particulate, such as a pressed cake. The pigment can be any type of pigment conventionally used by those skilled in the art, such as black pigments and other colored pigments including blue, black, brown, cyan, green, white, violet, magenta, red, orange, or yellow pigments. Mixtures of different pigments can also be used. Representative examples of black pigments include various carbon blacks (Pigment Black 7) such as channel blacks, furnace blacks, gas blacks, and lamp blacks, and include, for example, carbon blacks sold as Regal®, Black Pearls®, Elftex®, Monarch®, Mogul®, and Vulcan® carbon blacks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® 570, Black Pearls® L, Elftex® 8, Monarch® 1400, Monarch® 1300, Monarch® 1100, Monarch® 1000, Monarch® 900, Monarch® 880, Monarch® 800, Monarch® 700, Regal® 660, Mogul® L, Regal® 330, Regal® 400, Vulcan® P). Carbon blacks available from other suppliers can be used. Suitable classes of colored pigments include, for example, anthraquinones, phthalocyanine blues, phthalocyanine greens, diazos, monoazos, pyranthrones, perylenes, heterocyclic yellows, quinacridones, quinolonoquinolones, and (thio)indigoids. Such pigments are commercially available in either powder or press cake form from a number of sources including, BASF Corporation, Engelhard Corporation, Sun Chemical Corporation, Clariant, and Dianippon Ink and Chemicals (DIC). Examples of other suitable colored pigments are described in the Colour Index, 3rd edition (The Society of Dyers and Colourists, 1982). In one embodiment, the pigment is a cyan pigment, such as Pigment Blue 15 or Pigment Blue 60, a magenta pigment, such as Pigment Red 122, Pigment Red 177, Pigment Red 185, Pigment Red 202, or Pigment Violet 19, a yellow pigment, such as Pigment Yellow 74, Pigment Yellow 128, Pigment Yellow 139, Pigment Yellow 155, Pigment Yellow 180, Pigment Yellow 185, Pigment Yellow 218, Pigment Yellow 220, or Pigment Yellow 221, an orange pigment, such as Pigment Orange 168, a green pigment, such as Pigment Green 7 or Pigment Green 36, or black pigment, such as carbon black.

In one embodiment, the colorant comprises a pigment and a dye to modify color balance and adjust optical density.

In one embodiment, the pigment can be a self-dispersed pigment with a hydrophilic group or a polymer bonded to the surface of pigment particle, a polymer-dispersed pigment, and a microencapsulated pigment.

In one embodiment, the pigment is a self-dispersed pigment, e.g., selected from oxidized carbon black and pigments having attached at least one organic group. Such self-dispersed pigments can be prepared by modifying any of the pigments disclosed herein.

In one embodiment, the self-dispersed pigment is an oxidized carbon black. In one embodiment, "oxidized carbon blacks" are carbon black pigments generally having a pH<7.0 that feature surface-bound ionic or ionizable groups such as one or more of alcohols (phenols, naphthols), lactones, carbonyls, carboxyls (e.g., carboxylic acids), anhydrides, ethers, and quinones. The extent of oxidation of carbon black can determine the surface concentration of these groups. In one embodiment, the oxidized carbon black is obtained by oxidizing an unmodified carbon black, e.g., pigments selected from channel blacks, furnace blacks, gas blacks, and lamp blacks. Exemplary unmodified carbon blacks include those commercially available from Cabot Corporation as Regal®, Black Pearls®, Elftex®, Monarch®, Mogul®, and Vulcan®, such as Black Pearls® 1100, Black Pearls® 900, Black Pearls® 880, Black Pearls® 800, Black Pearls® 700, Black Pearls® 570, Elftex® 8, Monarch® 900, Monarch® 880, Monarch® 800, Monarch® 700, Regal® 660, and Regal® 330. Exemplary oxidizing agents for carbon blacks include oxygen gas, ozone, peroxides such as hydrogen peroxide, persulfates such as sodium and potassium persulfate, hypohalites such as sodium hypochlorite, nitric acid, and transition metal-containing oxidants such as permanganate salts, osmium tetroxide, chromium oxides, ceric ammonium nitrates, and mixtures thereof (e.g., mixtures of gaseous oxidants such as oxygen and ozone).

In another embodiment, the oxidized carbon black is obtained from commercial sources, such as Black Pearls® 1400, Black Pearls® 1300, Black Pearls® 1000, Black Pearls® L, Monarch® 1000, Mogul® L, and Regal® 400, available commercially from Cabot Corporation.

In one embodiment, the pigment has attached at least one organic group where an "attached" organic group can be distinguished from an adsorbed group in that a soxhlet extraction for several hours (e.g., at least 4, 6, 8, 12, or 24 hours) will not remove the attached group from the pigment.

In another embodiment, the organic group is attached to the pigment if the organic group cannot be removed after repeated washing with a solvent or solvent mixture that can dissolve the starting organic treating material but cannot disperse the treated pigment. In yet another embodiment, "attached" refers to a bond such as a covalent bond, e.g., a pigment bonded or covalently bonded to a nucleophile or organic group.

In one embodiment, the pigment is a carbon black. In one embodiment, the at least one organic group comprises a group selected from carboxylic acids, sulfonic acids, phosphonic acids, hydroxyls, amines, and esters, amides, and salts thereof. In another embodiment, the at least one organic group comprises the formula -[R(A)]-, wherein:

R is attached to the carbon black and is selected from arylene, heteroarylene, and alkylene, and A is selected from carboxylic acids, sulfonic acids, phosphonic acids, hydroxyls, amines, and esters, amides, and salts thereof.

The arylene, heteroarylene, and alkylene can be unsubstituted or substituted. Exemplary arylenes include phenylene, naphthylene, and biphenylene, and exemplary heteroarylenes include phenylene, naphthylene, and biphenylene having a ring carbon substituted with one or more oxygen or nitrogen atoms. In one embodiment, the arylene is a $C_5$-$C_{20}$ arylene. Heteroarylenes can be an arylene as defined herein which one or more ring carbon atoms is replaced with a heteroatom, e.g., N, O, and S. The heteroatom can be bonded to other groups in addition to being a ring atom. Alkylenes may be branched or unbranched. The alkylene may be a $C_1$-$C_{12}$ alkylene such as methylene, ethylene, propylene, or butylene.

In one embodiment, the attached organic group comprises at least one ionic group, ionizable group, or mixtures of an ionic group and an ionizable group. An ionic group can be either anionic or cationic and can be associated with a counterion of the opposite charge including inorganic or organic counterions, such as $Na^+$, $K^+$, $Li^+$, $NH_4^+$, $NR'_4^+$, acetate, $NO_3^-$, $SO_4^{-2}$, $R'SO_3^-$, $R'OSO_3^-$, $OH^-$, or $Cl^-$, where R' represents hydrogen or an organic group, such as a substituted or unsubstituted aryl or alkyl group. An ionizable group is one that is capable of forming an ionic group in the medium of use. Anionic groups are negatively charged ionic groups that can be generated from groups having ionizable substituents that can form anions (anionizable groups), such as acidic substituents. Cationic groups are positively charged organic ionic groups that can be generated from ionizable substituents that can form cations (cationizable groups), such as protonated amines. Specific examples of anionic groups include —$COO^-$, —$SO_3^-$, —$OSO_3^-$, —$HPO_3^-$; —$OPO_3^{-2}$, or —$PO_3^{-2}$, and specific examples of an anionizable group can include —COOH, —$SO_3H$, —$PO_3H_2$, —R'SH, or —R'OH, where R' represents hydrogen or an organic group, such as a substituted or unsubstituted aryl or alkyl group. Also, specific examples of cationic or cationizable groups include alkyl or aryl amines, which can be protonated in acidic media to form ammonium groups —$NR'_2H^+$, where R' represent an organic group, such as a substituted or unsubstituted aryl or alkyl groups. Organic ionic groups include those described in U.S. Pat. No. 5,698,016, the disclosure of which is incorporated herein by reference.

For example, the attached group may be an organic group such as a benzene carboxylic acid group (—$C_6H_4$—COOH group), a benzene dicarboxylic acid group, a benzene tricarboxylic acid group, a benzene sulfonic acid group (a —C$_6$H$_4$—SO$_3$H group), or salts thereof. In one embodiment, surface modification to introduce ionic or ionizable groups onto a pigment surface, such as chlorination and sulfonylation, may also be used.

In one embodiment, the attached organic group comprises a polymer. In one embodiment, the polymer comprises at least one non-ionic group. Examples include alkylene oxide groups of from about 1 to about 12 carbons and polyols, such as a —CH$_2$—CH$_2$—O— group, a —CH(CH$_3$)—CH$_2$—O— group, a —CH$_2$—CH(CH$_3$)—O— group, a —CH$_2$CH$_2$CH$_2$—O— group, or combinations thereof. These non-ionic groups may further comprise at least one ionic or ionizable group as disclosed herein.

In one embodiment, the polymer has a low acid number. In one embodiment, the polymer may be an acidic group containing polymer having an acid number of less than or equal to about 200, such as less than or equal to about 150, less than or equal to about 110, or less than or equal to about 100. In another embodiment, the acid number of the polymer is greater than or equal to about 30. Thus, the polymer may be an acidic group containing polymer having an acid number of from about 30 to about 200, such as from about 30 to about 110, from about 110 to about 150, or from about 150 to about 200

In one embodiment, the carbon black is modified with at least one organic group via a diazonium treatment as detailed, for instance, in the following patents: U.S. Pat. Nos. 5,554,739; 5,630,868; 5,672,198; 5,707,432; 5,851,280; 5,885,335; 5,895,522; 5,900,029; 5,922,118; 6,042,643; 6,534,569; 6,398,858 and 6,494,943 (high shear conditions) 6,372,820; 6,368,239; 6,350,519; 6,337,358; 6,103,380; 7,173,078; 7,056,962; 6,942,724; 6,929,889; 6,911,073; 6,478,863; 6,472,471; and WO 2011/143533, the disclosures of which are incorporated herein by reference. In one embodiment, the attachment is provided via a diazonium reaction where the at least one organic group has a diazonium salt substituent. In another embodiment, the direct attachment can be formed by using the diazonium and stable free radical methods described, for instance, in U.S. Pat. Nos. 6,068,688; 6,337,358; 6,368,239; 6,551,393; 6,852,158, the disclosures of which are incorporated herein by reference, which makes use of reacting at least one radical with at least one particle, wherein a radical is generated from the interaction of at least one transition metal compound with at least one organo-halide compound in the presence of one or more particles capable of radical capture, and the like. In one embodiment, the organic group is derived from amino-functionalized aromatic compounds, such as 4-aminobenzyl amine (4-ABA), 3-aminobenzyl amine (3-ABA), 2-aminobenzyl amine (2-ABA), 2-aminophenyl ethylamine, 4-aminophenyl-(2-sulfatoethyl)-sulphone, (APSES), p-aminobenzoic acid (PABA), 4-aminophthalic acid (4-APA), and 5-aminobenzene-1,2,3-tricarboxylic acid.

Another embodiment provides a dispersion comprising at least one pigment and the particulate materials disclosed herein. In one embodiment, the at least one pigment and particulate materials are dispersed in a liquid vehicle, e.g., an aqueous vehicle. In one embodiment, the aqueous solution contains greater than 50% by weight water and can be, for example, water or mixtures of water with water miscible solvents such as alcohols. In one embodiment, the amount of pigment present in the dispersion can be varied but is typically in an amount ranging from 0.1% to 30%, e.g., from 1% to 25%, from 1% to 20%, from 3% to 20%, from 3% to 15%, based on the total weight of the dispersion.

Another embodiment provides inkjet ink composition comprising at least one pigment and the particulate materials disclosed herein. In one embodiment, the ink compositions are aqueous compositions and comprise a colorant, optional solvents, and additives such as surfactants, biocides, and the core-shell polymeric material.

In one embodiment, the inkjet ink composition can be formulated to provide an amount of colorant such that the final amount in the inkjet ink composition is effective to provide the desired image quality (for example, optical density) without detrimentally affecting the performance of the inkjet ink. In one embodiment, the colorant (e.g., a pigment) is present in an amount ranging from 1% to 10% by weight, relative to the total weight of the composition, e.g., an amount ranging from 2% to 10% by weight, from 3% to 10% by weight, from 2% to 7% by weight, or from 3% to 7% by weight, relative to the total weight of the composition.

Dispersing agents (surfactants and/or dispersants) may be added to further enhance the colloidal stability of the composition or to change the interaction of the ink with either the printing substrate, such as printing paper, or with the ink printhead. Various anionic, cationic and nonionic dispersing agents can be used in conjunction with the ink composition of the present invention, and these may be used neat or as a water solution.

Representative examples of anionic dispersants or surfactants include, but are not limited to, higher fatty acid salts, higher alkyldicarboxylates, sulfuric acid ester salts of higher alcohols, higher alkyl-sulfonates, alkylbenzenesulfonates, alkylnaphthalene sulfonates, naphthalene sulfonates (Na, K, Li, Ca, etc.), formalin polycondensates, condensates between higher fatty acids and amino acids, dialkylsulfosuccinic acid ester salts, alkylsulfosuccinates, naphthenates, alkylether carboxylates, acylated peptides, α-olefin sulfonates, N-acrylmethyl taurine, alkylether sulfonates, secondary higher alcohol ethoxysulfates, polyoxyethylene alkylphenylether sulfates, monoglycylsulfates, alkylether phosphates and alkyl phosphates, alkyl phosphonates and bisphosphonates, included hydroxylated or aminated derivatives. For example, polymers and copolymers of styrene sulfonate salts, unsubstituted and substituted naphthalene sulfonate salts (e.g. alkyl or alkoxy substituted naphthalene derivatives), aldehyde derivatives (such as unsubstituted alkyl aldehyde derivatives including formaldehyde, acetaldehyde, propylaldehyde, and the like), maleic acid salts, and mixtures thereof may be used as the anionic dispersing aids. Salts include, for example, Na$^+$, Li$^+$, K$^+$, Cs$^+$, Rb$^+$, and substituted and unsubstituted ammonium cations. Representative examples of cationic surfactants include aliphatic amines, quaternary ammonium salts, sulfonium salts, phosphonium salts and the like.

Representative examples of nonionic dispersants or surfactants that can be used in ink jet inks of the present invention include fluorine derivatives, silicone derivatives, acrylic acid copolymers, polyoxyethylene alkyl ether, polyoxyethylene alkylphenyl ether, polyoxyethylene secondary alcohol ether, polyoxyethylene styrol ether, ethoxylated acetylenic diols, polyoxyethylene lanolin derivatives, ethylene oxide derivatives of alkylphenol formalin condensates, polyoxyethylene polyoxypropylene block polymers, fatty acid esters of polyoxyethylene polyoxypropylene alkylether polyoxyethylene compounds, ethylene glycol fatty acid esters of polyethylene oxide condensation type, fatty acid monoglycerides, fatty acid esters of polyglycerol, fatty acid esters of propylene glycol, cane sugar fatty acid esters, fatty acid alkanol amides, polyoxyethylene fatty acid amides and polyoxyethylene alkylamine oxides. For example, ethoxylated monoalkyl or dialkyl phenols may be used. These nonionic surfactants or dispersants can be used alone or in combination with the aforementioned anionic and cationic dispersants.

The dispersing agents may also be a natural polymer or a synthetic polymer dispersant. Specific examples of natural polymer dispersants include proteins such as glue, gelatin, casein and albumin; natural rubbers such as gum arabic and tragacanth gum; glucosides such as saponin; alginic acid, and alginic acid derivatives such as propyleneglycol alginate, triethanolamine alginate, and ammonium alginate; and cellulose derivatives such as methyl cellulose, carboxymethyl cellulose, hydroxyethyl cellulose and ethylhydroxy cellulose. Specific examples of polymeric dispersants, including synthetic polymeric dispersants, include polyvinyl alcohols, polyvinylpyrrolidones, acrylic or methacrylic resins (often written as "(meth)acrylic") such as poly(meth) acrylic acid, acrylic acid-(meth)acrylonitrile copolymers, potassium(meth)acrylate-(meth)acrylonitrile copolymers, vinyl acetate-(meth)acrylate ester copolymers and (meth) acrylic acid-(meth)acrylate ester copolymers; styreneacrylic or methacrylic resins such as styrene-(meth)acrylic acid copolymers, styrene-(meth)acrylic acid-(meth)acrylate ester copolymers, styrene-α-methylstyrene-(meth)acrylic acid copolymers, styrene-α-methylstyrene-(meth)acrylic acid-(meth)acrylate ester copolymers; styrene-maleic acid copolymers; styrene-maleic anhydride copolymers, vinyl naphthalene-acrylic or methacrylic acid copolymers; vinyl naphthalene-maleic acid copolymers; and vinyl acetate copolymers such as vinyl acetate-ethylene copolymer, vinyl acetate-fatty acid vinyl ethylene copolymers, vinyl acetate-maleate ester copolymers, vinyl acetate-crotonic acid copolymer and vinyl acetate-acrylic acid copolymer; and salts thereof.

Humectants and water soluble organic compounds may also be added to the inkjet ink composition of the present invention, particularly for the purpose of preventing clogging of the nozzle as well as for providing paper penetration (penetrants), improved drying (drying accelerators), and anti-cockling properties. Specific examples of humectants and other water soluble compounds that may be used include low molecular-weight glycols such as ethylene glycol, diethylene glycol, triethylene glycol, tetraethylene glycol and dipropylene glycol; diols containing from about 2 to about 40 carbon atoms, such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol), 1,3-propanediol, 1,4-butanediol, 1,5-pentanediol, 1,6-hexanediol, 1,2,6-hexanetriol, poly(ethylene-co-propylene)glycol, and the like, as well as their reaction products with alkylene oxides, including ethylene oxides, including ethylene oxide and propylene oxide; triol derivatives containing from about 3 to about 40 carbon atoms, including glycerine, trimethylolpropane, 1,3,5-pentanetriol, 1,2,6-hexanetriol, and the like as well as their reaction products with alkylene oxides, including ethylene oxide, propylene oxide, and mixtures thereof; neopentylglycol, (2,2-dimethyl-1,3-propanediol), and the like, as well as their reaction products with alkylene oxides, including ethylene oxide and propylene oxide in any desirable molar ratio to form materials with a wide range of molecular weights; thiodiglycol; pentaerythritol and lower alcohols such as ethanol, propanol, iso-propyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cyclopropanol; amides such as dimethyl formaldehyde and dimethyl acetamide; ketones or ketoalcohols such as acetone and diacetone alcohol; ethers such as tetrahydrofuran and dioxane; cellosolves such as ethylene glycol monomethyl ether and ethylene glycol monoethyl ether, triethylene glycol monomethyl (or monoethyl)ether; carbitols such as diethylene glycol monomethyl ether, diethylene glycol monoethyl ether, and diethylene glycol monobutyl ether; lactams such as 2-pyrrolidone, N-methyl-2-pyrrolidone and ε-caprolactam; urea and urea derivatives; inner salts such as betaine, and the like; thio(sulfur) derivatives of the aforementioned materials including 1-butanethiol; t-butanethiol 1-methyl-1-propanethiol, 2-methyl-1-propanethiol; 2-methyl-2-propanethiol; thiocyclopropanol, thioethyleneglycol, thiodiethyleneglycol, trithio- or dithio-diethyleneglycol, and the like; hydroxyamide derivatives, including acetylethanolamine, acetylpropanolamine, propylcarboxyethanolamine, propylcarboxy propanolamine, and the like; reaction products of the aforementioned materials with alkylene oxides; and mixtures thereof. Additional examples include saccharides such as maltitol, sorbitol, gluconolactone and maltose; polyhydric alcohols such as trimethylol propane and trimethylol ethane; N-methyl-2-pyrrolidone; 1,3-dimethyl-2-imidazolidinone; sulfoxide derivatives containing from about 2 to about 40 carbon atoms, including dialkylsulfides (symmetric and asymmetric sulfoxides) such as dimethylsulfoxide, methylethylsulfoxide, alkylphenyl sulfoxides, and the like; and sulfone derivatives (symmetric and asymmetric sulfones) containing from about 2 to about 40 carbon atoms, such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, dimethylsulfolane, and the like. Such materials may be used alone or in combination.

Biocides and/or fungicides may also be added to the inkjet ink composition of the present invention. Biocides are important in preventing bacterial growth since bacteria are often larger than ink nozzles and can cause clogging as well as other printing problems. Examples of useful biocides include, but are not limited to, benzoate or sorbate salts, and isothiazolinones.

In one embodiment, the inkjet ink composition comprises a cosolvent. In one embodiment, the cosolvent is soluble or miscible in water at concentrations of at least 10% by weight and is also chemically stable to aqueous hydrolysis conditions (e.g., reaction with water under heat aging conditions, including, for example, the hydrolysis of esters and lactones). In one embodiment, the cosolvent has a dielectric constant below that of water, such as a dielectric constant ranging from about 10 to about 78 at 20° C. Examples of suitable cosolvents include low molecular-weight glycols (such as ethylene glycol, diethylene glycol, triethylene glycol, tetraethylene glycol, dipropylene glycol, ethylene glycol monomethyl ether, ethylene glycol monoethyl ether, triethylene glycol monomethyl or monoethyl ether, diethylene glycol monomethyl ether, diethylene glycol monoethyl ether, diethylene glycol monobutyl ether, and tetraethylene glycol monobutyl ether); alcohols (such as ethanol, propanol, iso-propyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cyclopropanol); diols containing from about 2 to about 40 carbon atoms (such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol), 1,3-propanediol, 1,4-butanediol, 1,5-pentanediol, 1,6-hexanediol, 1,2,6-hexanetriol, and poly(ethylene-copropylene)glycol, as well as their reaction products with alkylene oxides, including ethylene oxides, including ethylene oxide and propylene oxide); triols containing from about 3 to about 40 carbon atoms (such as glycerine (glycerol), trimethylolethane, trimethylolpropane, 1,3,5-pentanetriol, 1,2,6-hexanetriol, and the like as well as their reaction products with alkylene oxides, including ethylene oxide, propylene oxide, and mixtures thereof); polyols (such as pentaerythritol); amides (such as dimethyl formaldehyde and dimethyl acetamide); ketones or ketoalcohols (such as acetone and diacetone alcohol); ethers (such as tetrahydrofuran and dioxane); lactams (such as 2-pyrrolidone, N-methyl-2-pyrrolidone, and ε-caprolactam); ureas or urea derivatives (such as di-(2-hydroxyethyl)-5,5,-dimethyl hydantoin (dantacol) and 1,3-dimethyl-2-imidazolidinone); inner salts (such as betaine); and hydroxyamide derivatives (such as acetylethanolamine, acetylpropanolamine, propylcarboxyethanolamine, and propylcarboxy propanolamine, as well as their reaction products with alkylene oxides). Additional examples include saccharides (such as maltitol, sorbitol, gluconolactone and maltose); sulfoxide derivatives (symmetric and asymmetric) containing from about 2 to about 40 carbon atoms (such as dimethylsulfoxide, methylethylsulfoxide, and alkylphenyl sulfoxides); and sulfone derivatives (symmetric and asymmetric) containing from about 2 to about 40 carbon atoms (such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, and dimethylsulfolane). These cosolvents may be used alone or in combination.

The amount of the cosolvent can be varied depending on a variety of factors, including the properties of the cosolvent (solubility and/or dielectric constant), the type of modified pigment, and the desired performance of the resulting inkjet ink composition. In particular, the optional cosolvent may be used in amounts of less than or equal to about 40% by weight based on the total weight of the inkjet ink composition, including less than or equal to about 30% and less than or equal to about 20%. Also, when used, the amount of the optional cosolvent is greater than or equal to about 2% by weight based on the total weight of the inkjet ink composition, including greater than or equal to about 5% and greater than or equal to about 10% by weight.

EXAMPLES

Abbreviations
  Abbreviations and commercial sources:
  IPDI=Isophorone diisocyanate
  HEMA=2-Hydroxyethyl methacrylate
  MMA=Methyl methacrylate
  MAA=Methacrylic acid
  AIBN=Azobisisobutyronitrile
  HQ=Hydroquinone
  EtOAc=Ethyl acetate
  EtOH=Ethanol
  IPA=2-Propanol
  THF=Tetrahydrofuran
  KOH=Potassium hydroxide
  PEG600=a polyethylene glycol with a molecular weight of 600 g/mol
  TMP=Trimethylolpropane
  SURFYNOL 465=a non-ionic surfactant from Air Products
  Fomrez 55-56=a polyester diol with a hydroxyl number of about 57 mg KOH/g (from Chemtura)

Example 1

HEMA-terminated Polyurethane I

To a 1 liter cylindrical reactor, equipped with a temperature monitor, a stirrer, a condenser, and a nitrogen gas line, were added 150.4 g of Fomrez 55-56. After the content was heated to 80° C. under nitrogen, a clear solution was thus obtained. 22.2 g of IPDI was then added to the mixture dropwise via an addition funnel or a plastic syringe. The reaction temperature was then raised to be about 95° C. and held for 4 hours. Then, 150 mL of EtOAc and 2.8 mL of HEMA were added slowly under stirring, respectively. After the addition was over, the reaction mixture was kept to be around 80° C. for 2.5 hours. In the end, after 5.38 mL of EtOH was added, the reaction continued for another one hour at 80° C. This batch of HEMA-terminated polyurethane polymer solution was cooled to room temperature under nitrogen for next step. Such polyurethane polymers functioned as the core of the core-shell polymer particles.

Example 2

Polyurethane-Acrylate Polymer I

To the HEMA-terminated polyurethane polymer I solution of Example 1, 150 mL of IPA was added. The polymer solution mixture was then heated to be around 80° C. Meanwhile, a mixture of 19 mL of styrene, 9.2 mL of MMA, 59.5 mL of MAA, 3.13 g of AIBN, and 100 mL of IPA was prepared and bubbled with nitrogen. This mixture was then added to the polymer solution dropwise via an addition funnel in about 2 hours at 80° C. After the addition was completed, the reaction continued for another 3 hours. In the end, 300 mL of THF was added and the PU-acrylate polymer solution was cooled to room temperature. Such acrylic-styrene-acrylate polymers functioned as the shell of the core-shell polymer particles.

Example 3

Core-Shell Polymer Particles I (CSPP-I)

Under stirring, 50 g of the polyurethane-acrylate polymer I solution of Example 2 was diluted with 181 mL of THF, followed by the slow addition of 8.5 g of 20 wt % aqueous KOH solution. A few minutes later, this mixture was added to about 195 g of water under fast stirring. A milky solution was obtained without any visible solid precipitate. The solvent was removed under vacuum and the solution was then filtered via 1μm filters. A final solution containing polymer particles with core-shell structure was obtained: 8.8% solid, particle size=361 nm, AN=150, core/shell weight ratio=2/1. Such dispersions remained stable at room temperature for months. The removal of water from this polymer particle solution via evaporation at room temperature led to the formation of a clear polymeric film.

Example 4

HEMA-terminated Polyurethane Polymer II

To a 1 liter cylindrical reactor, equipped with a temperature monitor, a stirrer, a condenser, and a nitrogen gas line, were added 150.4 g of Fomrez 55-56. After the content was heated to 80° C. under nitrogen, a clear solution was thus obtained. 22.2 g of IPDI was then added to the mixture dropwise via an addition funnel or a plastic syringe. The reaction temperature was then raised to be about 95° C. and held for 4 hours. Then, 300 mL of EtOAc, 11.2 mL of HEMA, and 0.102 g of HQ were added slowly under stirring, respectively. After the addition was over, the reaction mixture was kept to be around 80° C. for about 4 hours. In the end, after 5.38 mL of EtOH was added, the reaction continued for another one hour at 80° C. This batch of HEMA-terminated polyurethane polymer solution was cooled to room temperature under nitrogen for next step. Such polyurethane polymers functioned as the core of the core-shell polymer particles.

Example 5

Polyurethane-Acrylate Polymer II

Half amount of the HEMA-terminated polyurethane polymer II solution of Example 4 was used for the preparation of polyurethane-acrylate polymer II. After the addition of 50 mL of IPA, the polymer solution mixture was then heated to be around 75° C. Meanwhile, a mixture of 9.0 mL of styrene, 26.3 mL of MMA, 8.11 mL of MAA, 1.384 g of AIBN, and 30 mL of IPA was prepared and bubbled with nitrogen. This mixture was then added to the polymer solution dropwise via an addition funnel in about 1.5 hours at 75° C. After the addition was over, the reaction continued for another 4 hours. In the end, the polyurethane-acrylate polymer solution was cooled to room temperature. Such acrylic-styrene-acrylate polymers functioned as the shell of the core-shell polymer particles.

Example 6

Core-Shell Polymer Particles II (CSPP-II)

Under stirring, 50 g of the polyurethane-acrylate polymer solution of Example 5 was diluted with 275 mL of THF, followed by the slow addition of 9.5 g of 10 wt % aqueous KOH solution. A few minutes later, this mixture was added to about 270 g of water under fast stirring. A milky solution was obtained without any visible solid precipitate. The solvent was removed under vacuum and the solution was then filtered via 1μm filters. A final solution containing polymer particles with core-shell structure was obtained: 9.0% solid, particle size=294 nm, AN=43, core/shell weight ratio=2/1. Such dispersions remained stable at room temperature for months. The removal of water from this polymer particle solution via evaporation at room temperature led to the formation of a clear polymeric film.

Example 7

HEMA-terminated Polyurethane Polymer III

To a 1 liter cylindrical reactor, equipped with a temperature monitor, a stirrer, a condenser, and a nitrogen gas line, were added 130.3 g of Fomrez 55-56. After the content was heated to 80° C. under nitrogen, a clear solution was thus obtained. 22.2 g of IPDI was then added to the mixture dropwise via an addition funnel or a plastic syringe. The reaction temperature was then raised to be about 95° C. and held for 4 hours. Then, 250 mL of EtOAc, 15.64 mL of HEMA, and 0.142 g of HQ were added slowly under stirring, respectively. After the addition was over, the reaction mixture was kept to be around 80° C. for about 4 hours. In the end, after 11.8 mL of n-butanol was added, the reaction continued for another one hour at 80° C. This batch of HEMA-terminated polyurethane polymer solution was cooled to room temperature under nitrogen for next step. Such polyurethane polymers functioned as the core polymers of core-shell polymer particles.

Example 8

Polyurethane-Acrylate Polymer III

Half of the amount of the HEMA-terminated polyurethane polymer III solution of Example 7 was used for the preparation of polyurethane-acrylate polymer III. After the addition of 50 mL of IPA, the polymer solution mixture was then heated to be around 75° C. Meanwhile, a mixture of 7.4 mL of styrene, 19.3 mL of MMA, 8.62 mL of MAA, 1.142 g of AIBN, and 40 mL of IPA was prepared and bubbled with nitrogen. This mixture was then added to the polymer solution dropwise via an addition funnel in about 1.5 hours at 75° C. After the addition was over, the reaction continued for another 4 hours. In the end, the polyurethane-acrylate polymer solution was cooled to room temperature. Such acrylic-styrene-acrylate polymers functioned as the shell polymers of core-shell polymer particles.

Example 9

Core-Shell Polymer Particles III (CSPP-III)

Under stirring, 50 g of the polyurethane-acrylate polymer solution of Example 8 was diluted with 204 mL of THF, followed by the slow addition of 9.68 g of 10 wt % aqueous KOH solution. A few minutes later, this mixture was added to about 214 g of water under fast stirring. A milky solution was obtained without any visible solid precipitate. The solvent was removed under vacuum and the solution was then filtered via 1μm filters. A final solution containing polymer particles with core-shell structure was obtained: 9.3% solid, particle size=192 nm, AN=56, core/shell weight ratio=2/1. Such dispersions remained stable at room temperature for months. The removal of water from this polymer particle solution via evaporation at room temperature led to the formation of a clear polymeric film.

Example 10

Determination of the Core/Shell Weigh Ratio

The core/shell weight ratio was determined based on the amount of core polymer, which was equal to the total weight of all components used in the preparation of polyurethane, and that of shell polymer, which was equal to the total weight of all monomers used in the preparation of acrylate polymers.

Example 11

Determination of the Acid Number of Core-Shell Polymer Particles

For polymer particles with a core-shell structure, its acid number (AN) was calculated by using the amounts of acid-containing monomer, which was used to stabilize the final polymer particles in water, based on the following equation:

AN= moles of acid-containing monomer×56.1 mgKOH×1000/(the total mass (g) of monomers used for preparation of PU and monomers used for preparation of acrylate polymers).

Comparative Example A

Polymer Particles B (PP-A)

NeoRez™ R551 is an aliphatic polyether waterborne polyurethane from DSM Coating Resins Inc. The removal of water from this polymer particle solution via evaporation at room temperature led to the formation of a clear polymeric film.

Comparative Example B

Polymer Particles B (PP-B)

Neocryl™ A-1127 is a waterborne acrylic emulsion from DSM Coating Resins Inc. and has its glass transition temperature at −18° C. and MFFT at 7° C. The removal of water from this polymer particle solution via evaporation at room temperature led to the formation of a clear polymeric film.

Comparative Example C

Polymer Particles C (PP-C)

Neocryl™ A-2092 is a waterborne acrylic styrene emulsion from DSM Coating Resins Inc. and has its glass transition temperature at 8° C. and MFFT at 6° C. The removal of water from this polymer particle solution via evaporation at room temperature led to the formation of a clear polymeric film.

Comparative Example D

Polymer Particles D (PP-D)

NeoPac™ E200 is a waterborne urethane acrylics emulsion from DSM Coating Resins Inc. and has its MFFT at less than 0° C. It has a core/shell structure, where acrylate was the core polymer and urethane was the shell polymer. The removal of water from this polymer particle solution via evaporation at room temperature led to the formation of a clear polymeric film.

Comparative Example E

Polymer Particles E (PP-E)

NeoPac™ E125 is a waterborne urethane acrylics emulsion from DSM Coating Resins Inc. and has its MFFT at less than 10° C. It has a core/shell structure, where acrylate formed the core polymer and urethane formed the shell polymer. The removal of water from this polymer particle solution via evaporation at room temperature led to the formation of a clear polymeric film.

Comparative Example F

Polymer Particles F (PP-F)

Hybridur® 570 is an acrylic-urethane hybrid polymer from Air Products and has its MFFT at less than 10° C. Its polymer particles had a core/shell structure, where acrylate formed the core polymer and urethane formed the shell polymer. The removal of water from this polymer particle solution via evaporation at room temperature led to the formation of a clear polymeric film.

Comparative Example G

Polymer Particles G (PP-G)

Preparation of Non-vinyl-group-terminated Polyurethane Polymer G

To a 1 liter cylindrical reactor, equipped with a temperature monitor, a stirrer, a condenser, and a nitrogen gas line, were added 150.4 g of Fomrez 55-56. After the content was heated to 80° C. under nitrogen, a clear solution was thus obtained. 22.2 g of IPDI was then added to the mixture dropwise via an addition funnel or a plastic syringe. The reaction temperature was then raised to be about 95° C. and held for 4 hours. Then, 200 mL of EtOAc and 5.38 mL of ethanol were added slowly under stirring, respectively. After the addition was over, the reaction mixture was kept to be around 80° C. for about 4 hours. This batch of non-vinyl-group-terminated polyurethane polymer solution was cooled to room temperature under nitrogen for next step. Such polyurethane polymers functioned as the core polymers of polymer particles formed later.

Preparation of Polyurethane/Acrylate Polymer G

The non-vinyl-group-terminated polyurethane polymer G solution was used for the preparation of PU/acrylate polymer G. After the addition of 100 mL of IPA, the polymer solution mixture was then heated to be around 75° C. Meanwhile, a mixture of 18.3 mL of styrene, 26.6 mL of MMA, 41 mL of MAA, 2.93 g of AIBN, and 100 mL of IPA was prepared and bubbled with nitrogen. This mixture was then added to the polymer solution dropwise via an addition funnel in about 2 hours at 75° C. After the addition was over, the reaction continued for another 3 hours. In the end, the polyurethane/acrylate polymer solution was cooled to room temperature. Such acrylic-styrene-acrylate polymers functioned as the shell polymers of core-shell polymer particles.

Preparation of Polymer Particles G (PP-G)

Under stirring, 50 g of the polyurethane/acrylate polymer solution obtained above was diluted with 153 mL of THF, followed by the slow addition of 15 g of 10 wt % aqueous KOH solution. A few minutes later, this mixture was added to about 170 g of water under fast stirring. A milky solution was obtained without any visible solid precipitate, followed by solvent removal via vacuum. A final solution containing polymer particles with core-shell structure was obtained: particle size=2460 nm, AN=107, core/shell weight ratio=2/1. This batch of polymer particle dispersions became unstable quickly at room temperature, where polymer precipitates were observed on the bottom of the sample container.

Example 12

Carbon Black Dispersion

In this Example, the pigment used was a modified carbon black (i.e., carbon black attached with at least one organic group), in which the organic group includes at least one geminal bisphosphonic acid group or salt thereof. This modified pigment can be prepared, for example, by using the procedure described in U.S. Patent Application Publication No. 20070100024.

Example 13

Ink Compositions

Polymer particles CSPP I, II, and III, and Comparative polymer particles PP A-G were used as additives in ink formulations. Table 1 shows components of ink formulations (Inks I-V) containing CSPP1, II, and III. Table 2 shows components of comparative ink formulations (Comp-Inks I-VI) containing the Comparative polymer particles. The amounts listed are in weight percent of the final ink composition. The pigment dispersions and polymer particles were quoted on a solid basis.

TABLE 1

| Component | Ink I | Ink II | Ink III | Ink IV | Ink V |
|---|---|---|---|---|---|
| Black dispersion (pigment) | 4% | 4% | 4% | 4% | 4% |
| CSPP-I | 1% | | | | |
| CSPP-II | | 1% | | | |
| CSPP-III | | | 1% | | |
| CSPP-III | | | | 2% | |
| CSPP-III | | | | | 3% |
| Glycerol | 5% | 5% | 5% | 5% | 5% |
| PEG600 | 5% | 5% | 5% | 5% | 5% |
| TMP | 3% | 3% | 3% | 3% | 3% |
| Surfynol ® 465 | 0.1% | 0.1% | 0.1% | 0.1% | 0.1% |
| Water | balance | balance | balance | balance | balance |

TABLE 2

| Component | Comp-Ink I | Comp-Ink II | Comp-Ink III | Comp-Ink IV | Comp-Ink V | Comp-Ink VI |
|---|---|---|---|---|---|---|
| Black dispersion (pigment) | 4% | 4% | 4% | 4% | 4% | 4% |
| PP-A | 1% | | | | | |
| PP-B | | 1% | | | | |
| PP-C | | | 1% | | | |
| PP-D | | | | 1% | | |
| PP-E | | | | | 1% | |
| PP-F | | | | | | 1% |
| Glycerol | 5% | 5% | 5% | 5% | 5% | 5% |
| PEG600 | 5% | 5% | 5% | 5% | 5% | 5% |
| TMP | 3% | 3% | 3% | 3% | 3% | 3% |
| Surfynol ® 465 | 0.1% | 0.1% | 0.1% | 0.1% | 0.1% | 0.1% |
| Water | balance | balance | balance | balance | balance | balance |

Ink Evaluation

The inkjet ink compositions of Tables 1 and 2 were evaluated as follows.

The inkjet ink compositions were printed on paper using a Canon iP4000 thermal inkjet printer. Each inkjet ink composition was loaded into a Canon compatible cartridge (available from Inkjet Warehouse) and printed with the following printer settings: print quality: high; plain paper; grey scale; and no photo options selected. Images were printed on Hewlett-Packard multi-purpose printing paper (HPMP) and Xerox 4200 plain paper. Print properties of the resulting printed images were measured at various times after printing (particularly 5 minutes and 24 hours).

The optical density (OD) of the printed images was measured using either a SpectroEye Gretag or X-rite 938 spectrophotometers. For both instruments, the following settings were used: Illumination at D65, 2 degree Standard Observer, DIN density standard, white base set to Abs, and no filter. Results were reported as an average of OD values on these two papers. For each paper, OD value was reported as an average of at least three optical density measurements taken at two corners, and the middle of a page.

Smear resistance (i.e., smear-fastness) was measured in a highlight smear test (also referred to as the durability test) by using a yellow Sharpie ACCENT Yellow Highlighters #25025 as follows. A single pass or double pass (two swipes, one on top of the other) of the highlighter on a non-printed portion of the paper was performed to establish a reference value. Another single or double pass was then made across four 2-mm wide stripes printed 3 mm apart. Using the SpectroEye, the optical density (OD) value adjacent to the printed area for each swipe of the highlighter was measured, along with the reference OD value. The difference between the reference OD value and the measured OD value adjacent to the printed area (ΔOD) was the smear-fastness value. Usually, ΔOD values were recorded for tests from a single pass at 5 minutes after printing and a double pass at 24 hours after printing. Here, a single pass testing at 5 minutes after printing and a double pass testing at 24 hours after printing were referred to Smear-fastness Test I and Smear-fastness Test II, respectively. The results from these two tests were ranked as:

A=no or little smearing was found (i.e., when both of ΔOD values were no greater than 0.03, in which the two ΔOD values were measured from a single pass at 5 minutes after printing or a double pass at 24 hours after printing on HPMP and Xerox 4200 papers); and B=a slight amount of smearing was observed (i.e., when at least one of the two ΔOD values stayed outside the requirements for ranking A and ranking C, in which the two ΔOD values were measured from a single pass at 5 minutes after printing or a double pass at 24 hours after printing on HPMP and Xerox 4200 papers); and C=noticeable smearing was observed (i.e., when both of ΔOD values were no less than 0.15, in which the two ΔOD values were measured from a single pass at 5 minutes after printing or a double pass at 24 hours after printing on HPMP and Xerox 4200 papers).

For each inkjet ink composition, its jetting was evaluated by the printing test described as follows:

Each inkjet ink composition was printed using a Canon iP4000 thermal inkjet printer to generate 10 pages of solid (i.e., 100% ink coverage) black blocks (size: 6.5 inch×9.5 inch) with the following printer settings: print quality: normal; plain paper; grey scale; and no photo options selected. Images were printed on HPMP paper. These 10 pages of solid black prints were evaluated as:

Good=No or little defects;
Fair=Some missing lines on most of these 10 pages;
Poor=Many missing lines on most of these 10 pages; and
Worst=Ink was unable to print using Canon iP4000 printer.

The printing performance results are shown in Table 3.

TABLE 3

| Inks | wt % of polymer particle | polymer particle | OD | Jetting Test | Smear-fastness Test I | Smear-fastness Test II |
|---|---|---|---|---|---|---|
| Ink I | 1 | PU-core/ acrylate-shell | 1.37 | Good | B | B |
| Ink II | 1 | | 1.37 | Good | B | B |
| Ink III | 1 | | 1.30 | Good | A | B |
| Ink IV | 2 | | 1.38 | Good | A | A |
| Ink V | 3 | | 1.29 | Good | A | A |
| Comp- | 1 | PU only | no | Worst | no | no |

TABLE 3-continued

| Inks | wt % of polymer particle | polymer particle | OD | Jetting Test | Smear-fastness Test I | Smear-fastness Test II |
|---|---|---|---|---|---|---|
| Ink I | | | value* | | ranking* | ranking* |
| Comp-Ink II | 1 | poly-acrylate only | no value* | Worst | no ranking* | no ranking* |
| Comp-Ink III | 1 | | no value* | Worst | no ranking* | no ranking* |
| Comp-Ink IV | 1 | acrylate-core/PU-shell | no value* | Worst | no ranking* | no ranking* |
| Comp-Ink V | 1 | | no value* | Worst | no ranking* | no ranking* |
| Comp-Ink VI | 1 | | no value* | Worst | no ranking* | no ranking* |

*Since such example was unable to print in iP4000 printer, both OD measurement and smear-fastness tests could not be performed.

As evident from the results shown in Table 3, the inkjet recording inks of Ink Examples I-V, which comprise polymer particles having a polyurethane-core and a polyacrylate-shell, exhibited excellent jetting performance, high optical density, and improved resistance to smearing. In these Ink Examples I-V, the amounts of polymer particles were varied from 1 wt % to 3 wt %. In contrast, the inkjet recording inks of Comparative Ink Examples I-VI, which contained 1 wt % polymer particles with polyurethane-only, polyacrylate only, or a polyacrylate-core and polyurethane-shell structure, were unable to print. In addition, the core shell polymer particles prepared via copolymerization of non-vinyl-group-terminated polyurethane and ethylenically unsaturated monomers (i.e., PP-G) was not colloidally stable even at room temperature.

The use of the terms "a" and "an" and "the" are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. A method of making a particulate core-shell material, comprising:
reacting a vinyl-terminated polyurethane with ethylenically unsaturated monomers selected from hydroxyl-containing ethylenically unsaturated monomers,
wherein the reacting is performed in an organic solvent to form a solution containing the reaction product, and the method further comprises subjecting the reaction product to an aqueous solution to cause self-assembly of the core-shell material, and
wherein the vinyl-terminated polyurethane is the reaction product of an NCO-terminated polyurethane prepolymer and the hydroxyl-containing ethylenically unsaturated monomers, and the vinyl terminates the polyurethane via a urethane linkage.

2. The method of claim 1, wherein the reacting is performed in the presence of a radical initiator.

3. The method of claim 1, wherein the core has a $T_g$ less than or equal to 40° C.

4. The method of claim 1, wherein the core has a $T_g$ less than or equal to 30° C.

5. The method of claim 1, wherein the core has a $T_g$ less than or equal to 20° C.

6. The method of claim 1, wherein the shell has a $T_g$ of at least 20° C.

7. The method of claim 1, wherein the shell has a $T_g$ of at least 25° C.

8. The method of claim 1, wherein the shell has a $T_g$ of at least 30° C.

9. The method of claim 1, wherein a $T_g$ of the shell is at least 25° C. and a $T_g$ of the core is less than 25° C.

10. The method of claim 1, wherein the core comprises a crosslinked polyurethane.

11. The method of claim 1, wherein the core comprises a linear polyurethane.

12. The method of claim 1, wherein the core comprises a branched polyurethane.

13. The method of claim 1, wherein the core comprises a grafted polyurethane.

14. The method of claim 1, wherein the shell comprises a crosslinked polyacrylate.

15. The method of claim 1, wherein the shell comprises a linear polyacrylate.

16. The method of claim 1, wherein the shell comprises a branched polyacrylate.

17. The method of claim 1, wherein the shell comprises a grafted polyacrylate.

18. The method of claim 1, wherein a core:shell weight ratio ranges from 4:1 to 1:1.

19. The method of claim 1, wherein the core has a $T_g$ less than or equal to 50° C.

20. The method of claim 1, wherein a $T_g$ of the shell is greater than a $T_g$ of the core.

21. The method of claim 1, wherein a $T_g$ of the shell is at least 10° C. greater than a $T_g$ of the core.

22. The method of claim 1, wherein a $T_g$ of the shell is at least 30° C. and a $T_g$ of the core is less than 30° C.

* * * * *